United States Patent
Sion

(12) 
(10) Patent No.: US 7,052,643 B2
(45) Date of Patent: May 30, 2006

(54) METHOD AND AN INSTALLATION FOR SUBJECTING CARBON FABRICS TO HIGH TEMPERATURE HEAT TREATMENT AND TO DENSIFICATION BY CHEMICAL VAPOR INFILTRATION

(75) Inventor: Eric Sion, Lyons (FR)

(73) Assignee: Messier-Bugatti, Velizy Villacoublay (FR)

( * ) Notice: Subject to any disclaimer, the term of this patent is extended or adjusted under 35 U.S.C. 154(b) by 320 days.

(21) Appl. No.: 10/255,556

(22) Filed: Sep. 26, 2002

(65) Prior Publication Data

US 2004/0009113 A1 Jan. 15, 2004

(30) Foreign Application Priority Data

Jul. 12, 2002 (FR) .................................. 02 08822

(51) Int. Cl.
| | |
|---|---|
| *B29B 17/00* | (2006.01) |
| *B29C 7/00* | (2006.01) |
| *D01C 9/12* | (2006.01) |
| *C01B 3/02* | (2006.01) |
| *C09C 1/56* | (2006.01) |

(52) U.S. Cl. ...................... 264/344; 264/340; 264/345; 423/447.1; 423/447.2; 423/445 R; 423/460

(58) Field of Classification Search ................ 427/228, 427/237, 238, 248.1, 249.2, 255.12, 314, 427/582, DIG. 900; 264/29.1–29.7, 344, 264/340, 345; 423/447.1, 447.2, 445 R, 423/460

See application file for complete search history.

(56) References Cited

U.S. PATENT DOCUMENTS

| | | | | | |
|---|---|---|---|---|---|
| 4,913,736 | A | * | 4/1990 | Gimzeski | ..................... 75/631 |
| 5,154,776 | A | * | 10/1992 | Bloch | ......................... 134/22.1 |
| 5,773,122 | A | * | 6/1998 | Lennox et al. | ............... 428/119 |
| 6,109,209 | A | | 8/2000 | Rudolph et al. | ............ 118/724 |
| 2001/0051127 | A1 | * | 12/2001 | Morita et al. | ................ 423/460 |

FOREIGN PATENT DOCUMENTS

| | | |
|---|---|---|
| EP | 0 832 863 A2 | 4/1998 |
| EP | 1 063 318 A1 | 12/2000 |
| WO | WO 96/15285 | 5/1996 |

* cited by examiner

*Primary Examiner*—Michael P. Colaianni
(74) *Attorney, Agent, or Firm*—Weingarten, Schurgin, Gagnebin & Lebovici LLP

(57) ABSTRACT

Heat treatment is performed on preforms placed in an enclosure accompanied by sweeping with an inert gas under reduced pressure, and with a gaseous effluent being exhausted continuously via a first effluent outlet connected to an effluent exhaust circuit. At the end of the heat treatment, the first gaseous effluent outlet is closed so as to isolate the effluent exhaust circuit from the enclosure, sweeping of the enclosure with the inert gas is interrupted, and the heat-treated preforms are left in the enclosure and are subjected to densification by admitting a reagent gas into the enclosure via at least one reagent gas admission duct opening out into the enclosure, with gaseous effluent being exhausted via a second effluent outlet separate from the first, said second outlet being closed during the heat treatment step. Advantageously, metal, in particular sodium, contained in the gaseous effluent exhausted from the enclosure during the heat treatment step is neutralized.

13 Claims, 2 Drawing Sheets

METHOD AND AN INSTALLATION FOR SUBJECTING CARBON FABRICS TO HIGH TEMPERATURE HEAT TREATMENT AND TO DENSIFICATION BY CHEMICAL VAPOR INFILTRATION

BACKGROUND OF THE INVENTION

The invention relates to obtaining parts made of composite material comprising a carbon reinforcing fabric densified by a matrix formed by chemical vapor infiltration (CVI).

A particular field of application for the invention is that of obtaining parts made of thermostructural composite material comprising carbon fiber reinforcement densified by a matrix of carbon or ceramic. Such parts are used in the fields of aviation and space, and also for friction elements, in particular for brake disks.

The reinforcing fabric is typically obtained using carbon precursor fibers such as preoxidized polyacrylonitrile (PAN) fibers, pitch fibers, phenol fibers, or rayon fibers, all of which withstand the textile operations needed to shape such fabrics better than do carbon fibers.

The carbon precursor fiber fabric is transformed into a carbon fiber fabric or preform by applying heat treatment. On an industrial scale, the heat treatment is performed in an oven at substantially atmospheric pressure while being swept with an inert gas such as nitrogen. Temperature is raised progressively up to about 900° C. The transformation of the precursor into carbon is almost total, with the resulting carbon content generally exceeding 95%, and possibly reaching 99% or more. The loss of mass is considerable, being about 50%, and is accompanied by a large volume of gaseous effluent being produced.

For at least some applications, it is necessary not only to transform the precursor into carbon, but also to perform subsequent heat treatment at high temperature, in particular in order to eliminate metals or metallic impurities coming from the precursor and/or in order to confer special properties on the carbon fibers. This applies in particular to eliminating the sodium contained in preoxidized PAN, which sodium can have a harmful effect on the ability of the resulting composite material parts to withstand oxidation.

That is why, following a first carbonizing step and prior to densifying the fabric, preoxidized PAN carbon precursor fiber fabrics are sometimes subjected to heat treatment at high temperature and under reduced pressure in order to eliminate sodium by sublimation. This second step is performed under low pressure while sweeping with an inert gas such as nitrogen, and at a temperature that is generally higher than 1000° C., typically lying approximately in the range 1400° C. to 1650° C. in order to eliminate sodium, and possibly reaching 2000° C. or 2200° C. or even 2500° C. in order to eliminate other metallic impurities and/or to transform the properties of the fibers.

Steps of carbonizing, performing heat treatment at high temperature, and subsequent densification by chemical vapor infiltration are conventionally performed in respective special purpose installations. In industrial use, each of these steps lasts for several days. This explains why, in particular, the process of obtaining sodium-free composite material parts containing fiber reinforcement made using preoxidized PAN precursor is lengthy and expensive.

The same problems arise with carbon fibers coming from precursors other than preoxidized PAN and likewise containing sodium or other metals for elimination, such as magnesium or calcium, and also whenever it is necessary to eliminate metals or metallic impurities such as iron, nickel, or chromium, for example, which require heat treatment at high temperature, typically up to not less than 2000° C. or 2200° C., or even 2500° C. in order to be eliminated by sublimation.

OBJECT AND SUMMARY OF THE INVENTION

An object of the invention is to provide a method and an installation enabling composite material parts to be obtained by densifying carbon fiber preforms by means of chemical vapor infiltration, in particular preforms containing one or more metals that need to be eliminated, while achieving very significant savings in cost and in treatment duration.

This object is achieved by a method comprising the steps consisting in:
  placing the carbon fiber preforms in an enclosure;
  subjecting the preforms in the enclosure to heat treatment while sweeping the enclosure with inert gas under low pressure;
  during the heat treatment, continuously extracting gaseous effluent through a first effluent outlet connected to an effluent exhaust circuit;
  at the end of heat treatment, closing the first gas effluent outlet so as to isolate the effluent exhaust circuit from the enclosure;
  interrupting sweeping of the enclosure with inert gas; and
  leaving the heat-treated preforms in the enclosure and subjecting them to densification by admitting a reagent gas into the enclosure through at least one reagent gas admission duct opening out into the enclosure, gaseous effluent being extracted through a second effluent outlet distinct from the first, said second outlet being closed during the heat treatment step.

In a particular implementation, the method includes neutralizing the metal contained in the gaseous effluent extracted from the enclosure during the heat treatment step.

The metal, typically sodium, may be neutralized after the end of the heat treatment, e.g. by hydrating the sodium that has condensed on the wall of a pipe connected to the first effluent outlet. This may be achieved by injecting water into said pipe, in particular by injecting steam, possibly diluted in an inert gas such as nitrogen or argon.

In a variant, the metal, typically sodium, may be neutralized continuously during the heat treatment by injecting a neutralizing agent into the gaseous effluent while it is being extracted. The sodium-neutralizing agent may be water in the form of steam, or it may be carbon dioxide, optionally diluted in an inert gas such as nitrogen or argon.

In another particular implementation of the method, the first effluent evacuation circuit is purged after the end of the heat treatment. This purging may be performed during the step of densifying the carbon fabric, with the first effluent evacuation circuit then being isolated from the enclosure. Purging may be performed by injecting cleaning water into the first evacuation circuit, or by disassembling said circuit at least in part and washing it.

Advantageously, the or each duct for admitting reagent gas into the enclosure is swept by an inert gas during the heat treatment step so as to prevent any portion of the gaseous effluent produced during heat treatment gaining access to said duct.

In yet another particular implementation of the method, the first effluent evacuation circuit can be used, at least in part, to inject a cooling gas into the enclosure to cool the composite material parts as obtained after the end of the densification step.

Another object of the present invention is to provide an installation enabling the above-described method to be implemented.

This object is achieved by an installation comprising an enclosure, means for heating the enclosure, at least one inlet for admitting an inert sweeping gas into the enclosure, a first outlet for exhausting gaseous effluent from the enclosure, and a first effluent exhaust circuit comprising an effluent exhaust pipe connected to the first gaseous effluent outlet, in which installation there are further provided, according to the invention, at least one reagent gas admission duct opening out into the enclosure, a second outlet for exhausting gaseous effluent from the enclosure, a second effluent exhaust circuit connected to the second gaseous effluent outlet, a valve for isolating the first effluent exhaust circuit from the enclosure, and a valve for isolating the second effluent exhaust circuit from the enclosure.

In a particular embodiment, the installation comprises an injector device for injecting an agent into the effluent exhaust pipe connected to the first gaseous effluent outlet, said agent serving to neutralize metal contained in effluent extracted by the first effluent exhaust circuit. The injector device is disposed downstream from the valve for isolating the first effluent exhaust circuit. A plurality of injection points may be provided that are spaced apart from one another along the effluent evacuation pipe.

Means may be provided to enable the duct for admitting the reagent phase to be swept with an inert gas.

In another particular embodiment, the installation includes an inlet for admitting cooling gas into the enclosure. The cooling gas admission inlet and the first gaseous effluent outlet may be constituted by a common port.

BRIEF DESCRIPTION OF THE DRAWINGS

The invention will be better understood on reading the following description given by way of non-limiting indication and with reference to the accompanying drawings, in which.

DETAILED DESCRIPTION OF EMBODIMENTS

Figure 1:
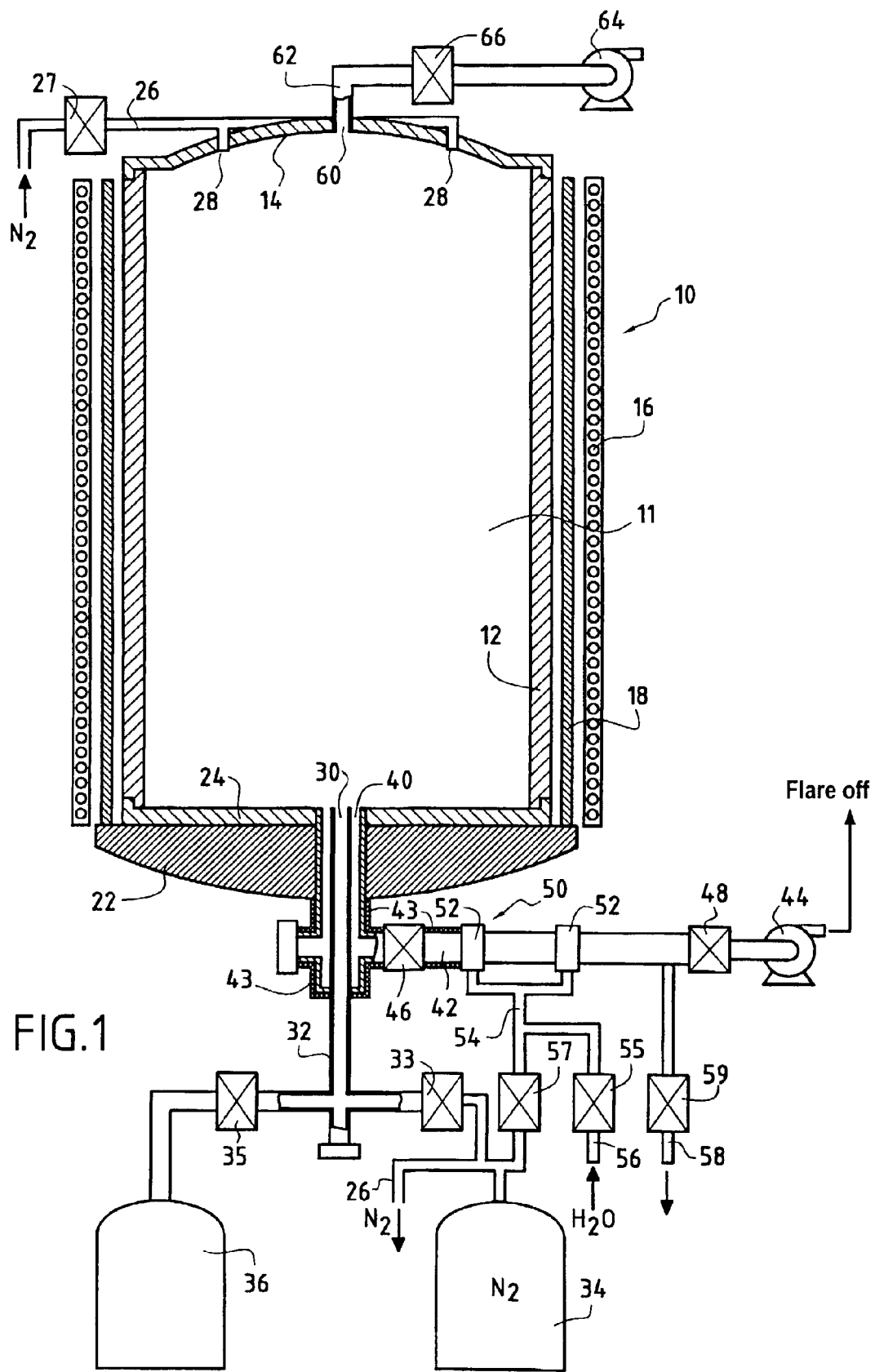
FIG. 1 is a highly diagrammatic view partially in section showing an embodiment of an installation of the invention.

FIG. 1 shows an installation comprising an oven 10 having a susceptor 12 in the form of a vertical-axis cylinder defining the sides of a volume 11 into which carbon fiber fabrics (not shown) are loaded, e.g. fiber preforms or pieces of fabric obtained by carbonizing fibers made of preoxidized PAN fibers. The susceptor 12 is surmounted by a cover 14.

The susceptor 12 is made of graphite for example and it is heated by inductive coupling with an inductor 16 which surrounds the susceptor, with thermal insulation 18 being interposed between them. The inductor is powered by a circuit (not shown) which delivers electricity as a function of the heating requirements of the oven.

The bottom of the oven is constituted by a thermal insulator 22 covered by an oven soleplate 24, e.g. made of graphite, on which the susceptor stands.

The assembly is received inside a casing, e.g. made of metal, (not shown).

A duct 26 for feeding inert gas for sweeping purposes, e.g. nitrogen, is connected to a source of nitrogen via a valve 27 and to one or more orifices 28 for injecting inert sweeping gas into the oven 10 through the cover 14.

An inlet 30 for admitting reagent gas into the oven is formed at the bottom thereof. The inlet 30 is connected to a feed duct 32. It is connected firstly to a source 34 of inert gas such as nitrogen ($N_2$), and secondly to a source 36 of reagent gas. Valves 33 and 35 enable the source 34 or the source 36 to be connected selectively to the duct 32. The source 34 is connected to the valve 27 mounted on the duct 26. The reagent gas source can be constituted by a plurality of cylinders containing different gases.

A first outlet 40 for extracting effluent gas from the oven is also formed through the bottom thereof. In the example shown, the outlet 40 is annular in shape, surrounding the end of the duct 32 connected to the inlet 30. Naturally, the outlet 40 could be formed separately from the inlet 30 in a different zone of the bottom of the oven. It should also be observed that a plurality of distinct reagent gas inlets could also be provided through the bottom of the oven.

An effluent gas evacuation pipe 42 is connected to the outlet 40 and connects it to a circuit for evacuating effluent gas from the oven, which circuit includes at least one vacuum pump 44. A valve 46 is mounted in the pipe 42 close to the outlet 40 so as to enable the evacuation circuit to be isolated from the inside of the oven.

An injector device 50 is mounted on the pipe 42 between the valve 46 and a valve 48 situated at the inlet of the pump 44 for the purpose of injecting an agent to neutralize substances contained in the gaseous effluent extracted through the outlet 40, which substances can be constituted in particular by sodium on its own or in compound form. The injector device 50 comprises one or more hollow injection rings 52 surrounding the pipe 42. In the example shown, two rings are provided that are spaced apart from each other along the pipe 42. The injection rings 52 are fed in parallel by a duct 54 connected both to a source of neutralizing agent, e.g. a source of steam via a duct 56 fitted with a valve 55, and also to the source 34 of nitrogen, with a valve 57 being interposed. Upstream from the valve 48 in the gas effluent flow direction, the pipe 42 has a purge orifice connected to a purge duct 58 fitted with a valve 59.

Figures 2, 3:
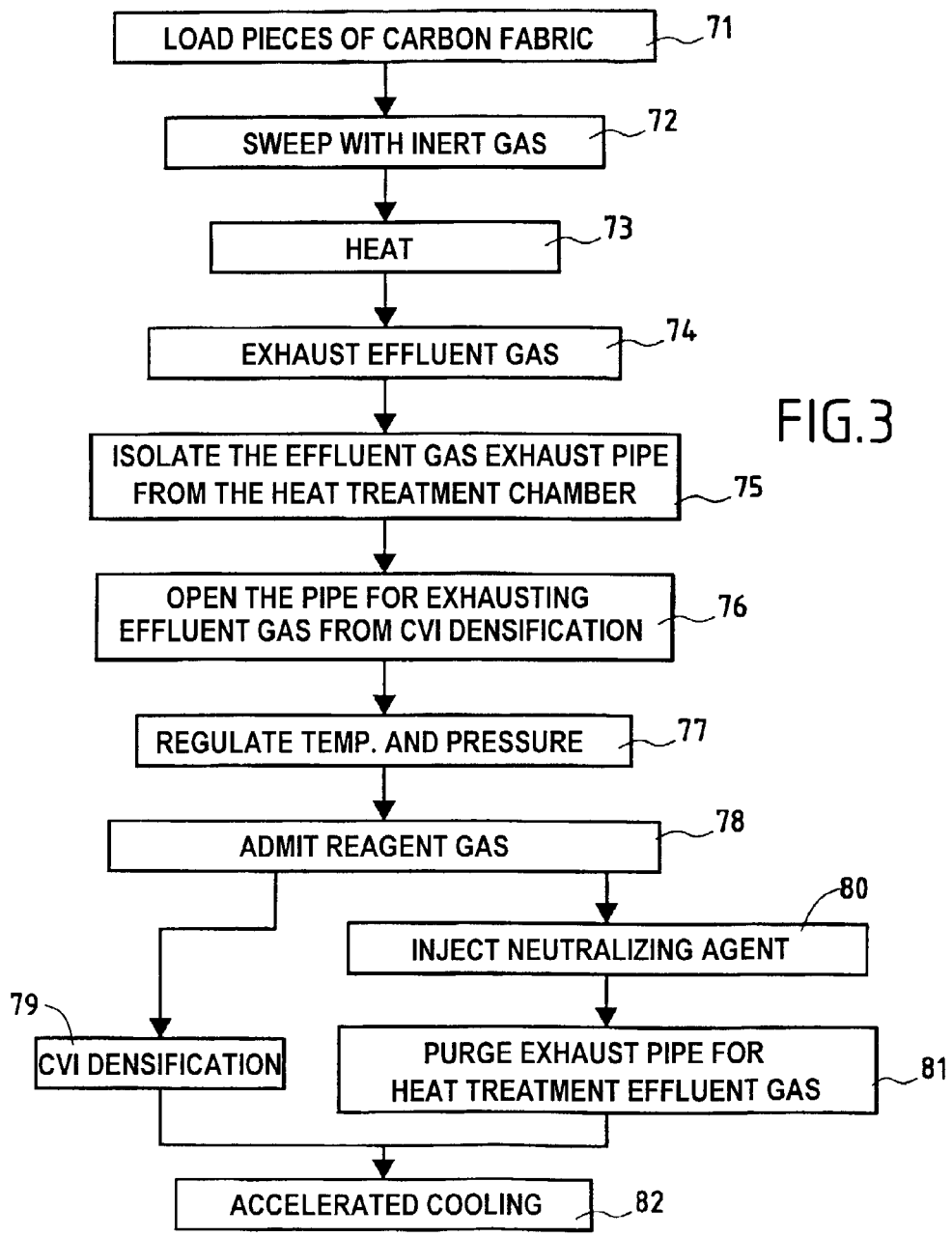
FIG. 2 is a more detailed view of the device for injecting neutralizing agent into the FIG. 1 installation.
FIG. 3 is a flow chart showing the steps in an implementation of the method of the invention.

As shown in greater detail in FIG. 2, each injection ring 52 forms a toroidal chamber surrounding the pipe 42 and communicating therewith via holes 54 formed through the wall of the pipe. The holes 54 may be inclined relative to the normal to the wall of the pipe 42 so as to direct the flow of neutralizing agent downstream.

Between the bottom 22 of the oven and the injector ring 52 situated furthest upstream along the pipe 42, the pipe is thermally insulated by lagging 43 so as to prevent the gaseous effluent extracted through the outlet 40 from cooling down too quickly. The lagging 43 may be accompanied and/or replaced at least in part by means for heating the pipe 42, e.g. electrical resistances.

A second outlet 60 for extracting effluent gas from the oven is formed through the cover 14. The outlet 60 is connected via a pipe 62 to a pump system such as a vacuum pump 64 or an ejector/condensor device. A valve 66 is mounted in the pipe 62 close to the outlet 60.

The above-described installation operates as follows. Reference is also made to FIG. 3.

Carbon fabric, e.g. pieces of preoxidized PAN carbon preform fiber fabric are loaded into the oven 10 (step 71), with the enclosure 11 being provided in conventional manner with fabric-loading tooling. The pieces of fabric may be in the form of preforms for parts that are to be made of composite material.

With the valves 35, 55, 57, 59, and 66 closed and the valves 27, 33, 46, and 48 open, the enclosure is swept using an inert gas, specifically nitrogen, admitted via the duct 26 and the openings 28, and coming from the source 34 (step 72), and the pipe 32 for feeding the inlet 30 with reagent gas is simultaneously swept with the nitrogen admitted via the valve 33, the pump 44 then being in operation.

The temperature in the oven is raised progressively by powering the inductor 16 (step 73) until the temperature rises to a value higher than 1000° C. and that is preferably not less than 1400° C., e.g. lying in the range 1400° C. to 1650° C., when it is desired to eliminate sodium contained in the carbon fabric, and possibly reaching 2000° C. or 2200° C., or even 2500° C. when it is desired to eliminate other metallic impurities or to confer special properties on the carbon fibers by performing heat treatment at very high temperature. The pressure inside the enclosure 11 is regulated to a value lying, for example, in the range 0.1 kilopascals (kPa) to 50 kPa, and preferably to a pressure of less than 5 kPa.

The effluent gas containing the sweeping nitrogen and the gaseous products that result from applying heat treatment to the carbon fabric, and in particular sodium in the sublimed state, on its own or in compound form, is extracted from the enclosure via the outlet 40 and is exhausted via the pipe 42 (step 74).

Sodium on its own or in compound form as extracted in the sublimed state via the outlet 40 condenses on portions of the pipe wall. The injector device 50 is placed in such a manner that the injection ring 52 situated furthest upstream is relatively close to the outlet 40, upstream from the zone where such condensation takes place. The lagging and/or heating of the portion of pipe 42 situated between the outlet in the bottom of the oven and said upstream injection ring contribute to preventing premature condensation of sodium so as to ensure that the sodium is deposited between the two injection rings.

The outlet from the pump 44 may exhaust to the atmosphere or via a burn-off flare.

Heat treatment is continued for sufficient time to eliminate all or nearly all of the sodium, for example for a duration lying in the range zero to 5 hours (h) approximately, in an industrial application.

The purpose of sweeping the pipe 32 and the reagent gas feed inlet 40 with inert gas is to prevent any fraction of the gaseous effluent produced during heat treatment reaching the duct 32 where that could lead to sodium condensing on the walls of the duct 32.

At the end of heat treatment, the valves 27 and 46 are closed so as to isolate the exhaust pipe 42 from the enclosure (step 75), while the pump 44 is stopped. The valves 33 and 66 are opened so as to continue sweeping the enclosure with inert gas, the exhaust pipe 62 being open and the pump 64 being set into operation (step 76). The temperature and the pressure inside the enclosure 11 are adjusted to the values desired for the stage of densification by chemical vapor infiltration (step 77).

The valve 35 is then opened, and the valve 33 is closed, in order to admit the reagent gas into the enclosure (step 78) and to densify the pieces of fabric made of carbon fibers that have been purified by the heat treatment (step 79). Chemical vapor infiltration processes are well known. As an example, in order to densify carbon fiber fabrics with a matrix of pyrolytic carbon, it is possible to use a reagent gas made up in particular of methane and/or propane, with the temperature inside the enclosure being about 900° C. to 1100° C. and with the pressure lying in the range about 1 kPa to 100 kPa.

When other materials are to be deposited within the pores of fabric to be densified, for example ceramic materials, a reagent gas is selected that comprises appropriate gaseous precursors, in well-known manner.

During the step of densification by chemical vapor infiltration, the sodium that has condensed on the walls of the exhaust pipe 42 is neutralized by being hydrated (step 80).

For this purpose, with the valves 55, 57, and 59 being open and with the valve 48 closed, steam is introduced into the duct 56. A mixture of steam and nitrogen (wet nitrogen) is delivered to the injection rings 52 so as to come into contact with the deposits of solid sodium that have formed on the wall of the pipe 42, thereby neutralizing the sodium by hydrating it. It is not essential to mix the steam with nitrogen, but doing so serves to dilute the steam and to avoid excessively violent reaction with the sodium, given that the quantity of sodium to be neutralized is small.

The pipe 42 can then be purged (step 81). With the valves 55 and 59 open and with the valves 57 and 48 closed, water is admitted in liquid form into the duct 56 and thus into the injector device 50. The pipe 42 can be rinsed on a plurality of consecutive occasions in order to eliminate the sodium hydroxide previously produced by neutralizing the sodium.

After rinsing, the pipe 42 may be dried merely by opening the valve 48 and setting the pump 44 into operation while the vales 55, 57, and 59 are closed.

At the end of the chemical vapor infiltration process, the composite material parts obtained by densifying pieces of carbon fabric can be cooled down in accelerated manner (step 82).

For this purpose, after the valve 35 has been closed, nitrogen can be admitted at ambient temperature into the enclosure by opening the valve 33 or by opening the valves 57 and 46, with accelerated cooling then being performed in the enclosure by using the exhaust pipe 42 to deliver nitrogen into the enclosure 11, given that the pipe 42 has by then been purged and dried.

In the above, steam is envisaged as the agent for use in neutralizing sodium.

Other agents for neutralizing sodium an be used, for example carbon dioxide ($CO_2$) injected into the pipe 42. $CO_2$ can be injected continuously during the heat treatment step so as to cause sodium carbonate to be deposited. The injected $CO_2$ can be diluted by inert gas such as nitrogen. The pipe 42, and possibly also other portions of the effluent exhaust circuit in which sodium carbonate might become deposited, are purged after heat treatment has come to an end. Purging is performed, for example, by rinsing in water, possibly after disassembling those portions of the exhaust circuit that are to be purged.

It should be observed that in the installation of FIG. 1, the sodium extracted from the carbon fiber fabric during heat treatment can alternatively be hydrated on a continuous basis while said treatment is taking place, instead of after it has come to an end. The steam and nitrogen mixture is then injected continuously into the gaseous effluent extracted via the exhaust pipe 42.

The method described above in the context of an application to preoxidized PAN carbon precursor fiber fabric containing sodium can also be used with carbon fabric coming from other precursors, but also containing sodium or other metals that need to be eliminated such as magnesium or calcium.

The method can also be used to confer particular properties on the carbon fibers by subjecting them to heat treatment at very high temperature and/or in order to eliminate metallic impurities, in particular comprising iron, nickel, or chromium by choosing to perform the heat treatment at a temperature of 2000° C. or more, for example 2200° C. or even 2500° C. There is no need to neutralize such metallic impurities that are exhausted with the effluent gas.

The invention claimed is:

1. A method of subjecting carbon fiber preforms to high temperature heat treatment and to densification by chemical vapor infiltration, the method comprising the steps of:
    placing the carbon fiber preforms in an enclosure;
    subjecting the preforms in the enclosure to a heat treatment at a temperature sufficient for eliminating all or nearly all metallic impurities contained in the carbon fibers while sweeping the enclosure with inert gas under low pressure;
    during the heat treatment, continuously extracting gaseous effluent containing metallic impurities through a first effluent outlet connected to an effluent exhaust circuit;
    at the end of heat treatment, closing the first gas effluent outlet so as to isolate the effluent exhaust circuit from the enclosure;
    interrupting sweeping of the enclosure with inert gas; and
    leaving the heat-treated preforms in the enclosure and subjecting them to densification by admitting a reagent gas into the enclosure through at least one reagent gas admission duct opening out into the enclosure, gaseous effluent being extracted through a second effluent outlet distinct from the first, said second outlet being closed during the heat treatment step.

2. A method according to claim 1, including neutralization of sodium that is contained in the gaseous effluent extracted from the enclosure during the heat treatment step.

3. A method according to claim 2, wherein neutralization is performed by injecting steam into an effluent exhaust pipe connected to the first effluent outlet.

4. A method according to claim 3, wherein neutralization is performed by injecting a mixture of inert gas and steam.

5. A method according to claim 2, wherein neutralization is performed by injecting carbon dioxide into an effluent exhaust pipe connected to the first effluent outlet.

6. A method according to claim 5, wherein neutralization is performed by injecting a mixture of inert gas and carbon dioxide into an effluent exhaust pipe connected to the first effluent outlet.

7. A method according to claim 3, wherein neutralization is performed continuously while the gaseous effluent is being extracted during heat treatment.

8. A method according to claim 3, wherein neutralization is performed after the end of heat treatment by hydrating metal condensed on the wall of an exhaust pipe connected to the first effluent outlet.

9. A method according to claim 1, wherein the effluent exhaust circuit connected to the first effluent outlet is purged after the end of the heat treatment.

10. A method according to claim 9, wherein the effluent exhaust circuit is purged during the step of densification by chemical vapor infiltration.

11. A method according to claim 1, wherein said duct for admitting reagent gas into the enclosure is swept by the inert gas during heat treatment.

12. A method according to claim 1, including a step of cooling densified preforms by admitting a cooling gas into the enclosure after the step of densifying the preforms by chemical vapor infiltration, wherein the cooling gas is admitted via the first effluent outlet.

13. A method according to claim 12, wherein the cooling gas is admitted via at least a portion of the effluent exhaust circuit.

* * * * *

UNITED STATES PATENT AND TRADEMARK OFFICE
CERTIFICATE OF CORRECTION

PATENT NO. : 7,052,643 B2 Page 1 of 1
APPLICATION NO. : 10/255556
DATED : May 30, 2006
INVENTOR(S) : Eric Sion It is certified that error appears in the above-identified patent and that said Letters Patent is hereby corrected as shown below:

Title page, Item (75) Inventor, "Lyons (FR)" should read -- Lyon (FR) --.

Signed and Sealed this

Twenty-second Day of May, 2007

JON W. DUDAS
*Director of the United States Patent and Trademark Office*